(12) United States Patent
McCaffrey

(10) Patent No.: US 10,801,349 B2
(45) Date of Patent: Oct. 13, 2020

(54) CERAMIC MATRIX COMPOSITE BLADE OUTER AIR SEAL

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 169 days.

(21) Appl. No.: 15/686,906

(22) Filed: Aug. 25, 2017

(65) Prior Publication Data

US 2019/0063249 A1 Feb. 28, 2019

(51) Int. Cl.
    *F01D 11/08* (2006.01)
    *F01D 25/24* (2006.01)
    *F01D 25/28* (2006.01)

(52) U.S. Cl.
    CPC ............. *F01D 11/08* (2013.01); *F01D 25/24* (2013.01); *F01D 25/28* (2013.01); *F05D 2220/32* (2013.01); *F05D 2230/60* (2013.01); *F05D 2240/11* (2013.01); *F05D 2300/6033* (2013.01)

(58) Field of Classification Search
    CPC .......... F01D 11/08; F01D 25/28; F01D 25/24; F05D 2220/32; F05D 2230/60; F05D 2300/6033; F05D 2240/11

USPC ........................................................ 415/173.1
See application file for complete search history.

(56) References Cited

U.S. PATENT DOCUMENTS

| | | | |
|---|---|---|---|
| 6,733,235 B2 | 5/2004 | Alford et al. | |
| 9,546,562 B2 | 1/2017 | Hillier | |
| 2009/0169368 A1 | 7/2009 | Schlichting et al. | |
| 2012/0275898 A1* | 11/2012 | McCaffrey | F01D 11/18 415/1 |
| 2016/0215645 A1* | 7/2016 | McCaffrey | F01D 25/246 |
| 2016/0222828 A1 | 8/2016 | McCaffrey | |
| 2016/0319841 A1 | 11/2016 | McCaffrey | |
| 2017/0037740 A1 | 2/2017 | O'Leary et al. | |
| 2017/0044920 A1 | 2/2017 | Vetter et al. | |

OTHER PUBLICATIONS

European Search Report for European Patent Application No. 18190807.0 dated Dec. 10, 2018.

* cited by examiner

*Primary Examiner* — Joseph J Dallo
*Assistant Examiner* — Scott A Reinbold
(74) *Attorney, Agent, or Firm* — Carlson, Gaskey & Olds, P.C.

(57) ABSTRACT

A blade outer air seal (BOAS) includes a tube of a ceramic matrix composite (CMC) material. A preform within the shell defines a mount for the BOAS. The preform is of a CMC material. A gas turbine engine and a method of forming a blade outer air seal (BOAS) are also disclosed.

19 Claims, 4 Drawing Sheets

CERAMIC MATRIX COMPOSITE BLADE OUTER AIR SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The compressor and turbine sections include alternating stages of rotating blades and fixed vanes. The vanes direct flow at a desired angle into the rotating blade stage. The rotating blade rows rotate within an engine case. A blade outer air seal is provided at each rotating blade stage to establish an outer radial flow path boundary. Moreover, the blade outer air seal provides a clearance between a tip of the rotating blade stages and the outer radial flow path boundary.

Turbine engine manufacturers continue to seek improvements to engine performance including improvements in engine assembly, material capabilities, and thermal, transfer and propulsive efficiencies.

SUMMARY

In a featured embodiment, a blade outer air seal (BOAS) includes a tube of a ceramic matrix composite (CMC) material. A preform within the shell defines a mount for the BOAS. The preform is of a CMC material.

In another embodiment according to the previous embodiment, the tube has a first open end and a second open end at opposite sides of the BOAS, and the preform includes a first preform in the first open end facing circumferentially outward and a second preform in the second open end facing circumferentially outward opposite the first preform.

In another embodiment according to any of the previous embodiments, the first preform and the second preform define a curved surface defining a first slot on the first end and a second slot on the second end.

In another embodiment according to any of the previous embodiments, the first preform and the second preform have primary fibers substantially following a contour of a corresponding one of the first slot and the second slot.

In another embodiment according to any of the previous embodiments, includes at least one insert for each of the first preform and the second preform supporting a portion of the corresponding one of the first preform and the second preform.

In another embodiment according to any of the previous embodiments, the tube includes a substantially rectangular shape with a radially inner surface and a radially outer surface. The radially outer surface includes a first cutout and a second cutout at respective first and second ends.

In another embodiment according to any of the previous embodiments, each of the first end and the second end includes an end groove for a seal.

In another embodiment according to any of the previous embodiments, the tube has primary CMC fibers form one of a three-dimensional braid, a plurality of two-dimensional layers and a three-dimensional weave.

In another embodiment according to any of the previous embodiments, the tube has primary CMC fibers substantially following a longitudinal length of the BOAS.

In another featured embodiment, a gas turbine engine includes a case. A mount is attached to the case. A blade outer air seal (BOAS) has a preform disposed within a tube. The preform defines a slot for receiving the mount. The tube and the preform are provided by a ceramic matrix composite (CMC) material.

In another embodiment according to any of the previous embodiments, the tube has a first open end and a second open end at opposite sides of the BOAS, and the preform includes a first preform defining a first slot in the first open end facing circumferentially outward and a second preform defines a second slot in the second open end facing circumferentially outward opposite the first preform.

In another embodiment according to any of the previous embodiments, the first preform and the second preform have primary fibers substantially following a contour of a corresponding one of the first slot and the second slot.

In another embodiment according to any of the previous embodiments, includes at least one insert for each of the first preform and the second preform supporting a portion of the corresponding one of the first preform and the second preform.

In another embodiment according to any of the previous embodiments, the tube includes a substantially rectangular shape with a radially inner surface and a radially outer surface. The radially outer surface includes a first cutout and a second cutout at respective first and second ends.

In another embodiment according to any of the previous embodiments, each of the first end and the second end includes an end groove for a seal.

In another featured embodiment, a method of forming a blade outer air seal (BOAS) includes forming a substantially rectangular tube of ceramic matrix composite (CMC) material. A first preform and a second preform is formed from a CMC material. The first preform is assembled into a first end of the tube and the second preform is assembled into a second end of the tube.

In another embodiment according to any of the previous embodiments, the first preform and the second preform are formed separate from the tube to define a respective first slot and second slot and forming of the first preform and the second preform includes orientating primary fibers to substantially follow a contour of the respective first slot and the second slot.

In another embodiment according to any of the previous embodiments, forming the tube to include a radially outer surface and a radially inner surface and forming the radially outer surface to include a first cutout at the first end and a second cutout at the second end.

In another embodiment according to any of the previous embodiments, assembling the first preform into the first end and the second preform into the second end includes installing at least one insert for supporting a portion of each of the first preform and the second preform.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
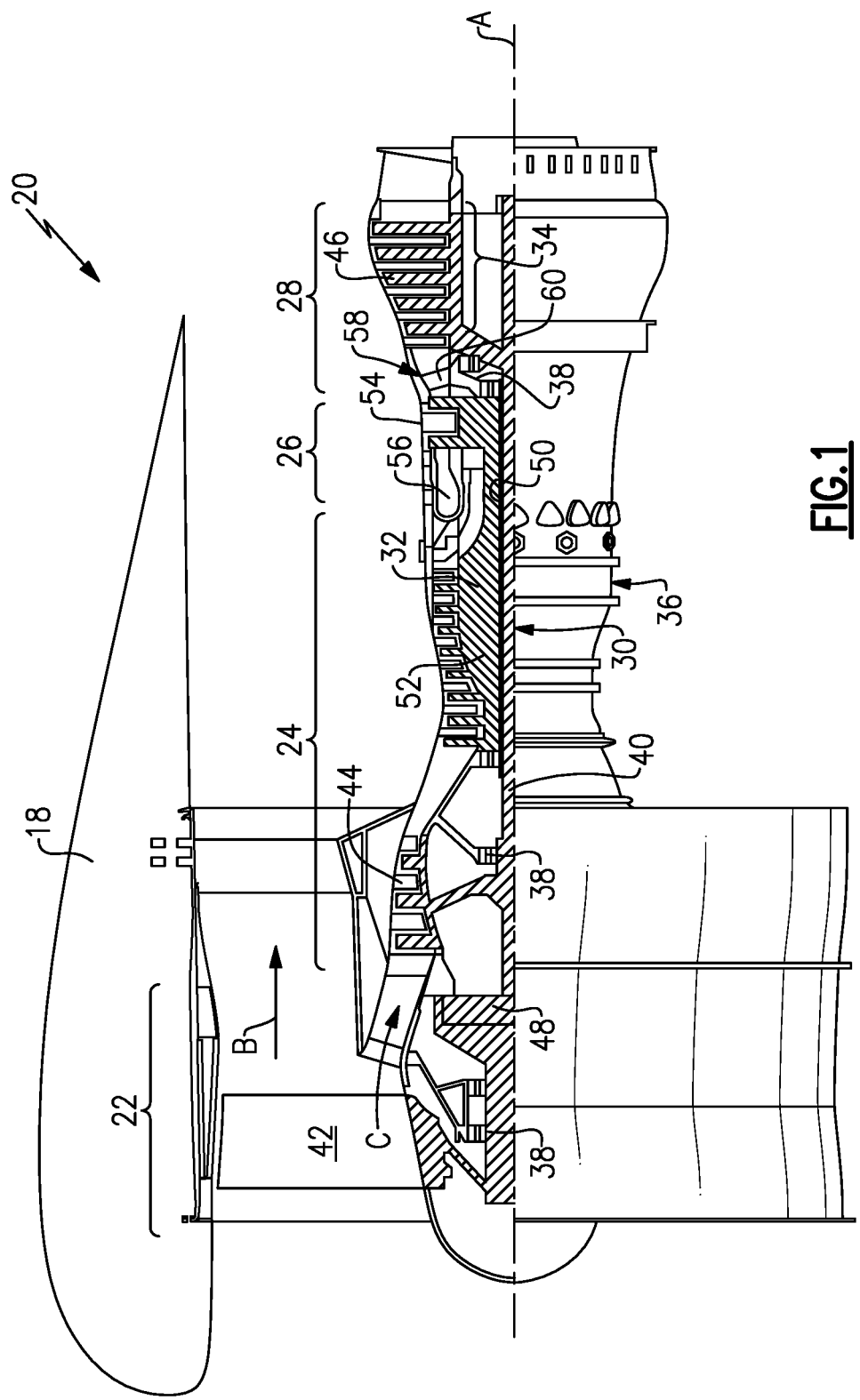
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans, land based turbine engines utilized for power generation as well as turbine engines for use in land based vehicles and naval propulsion.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
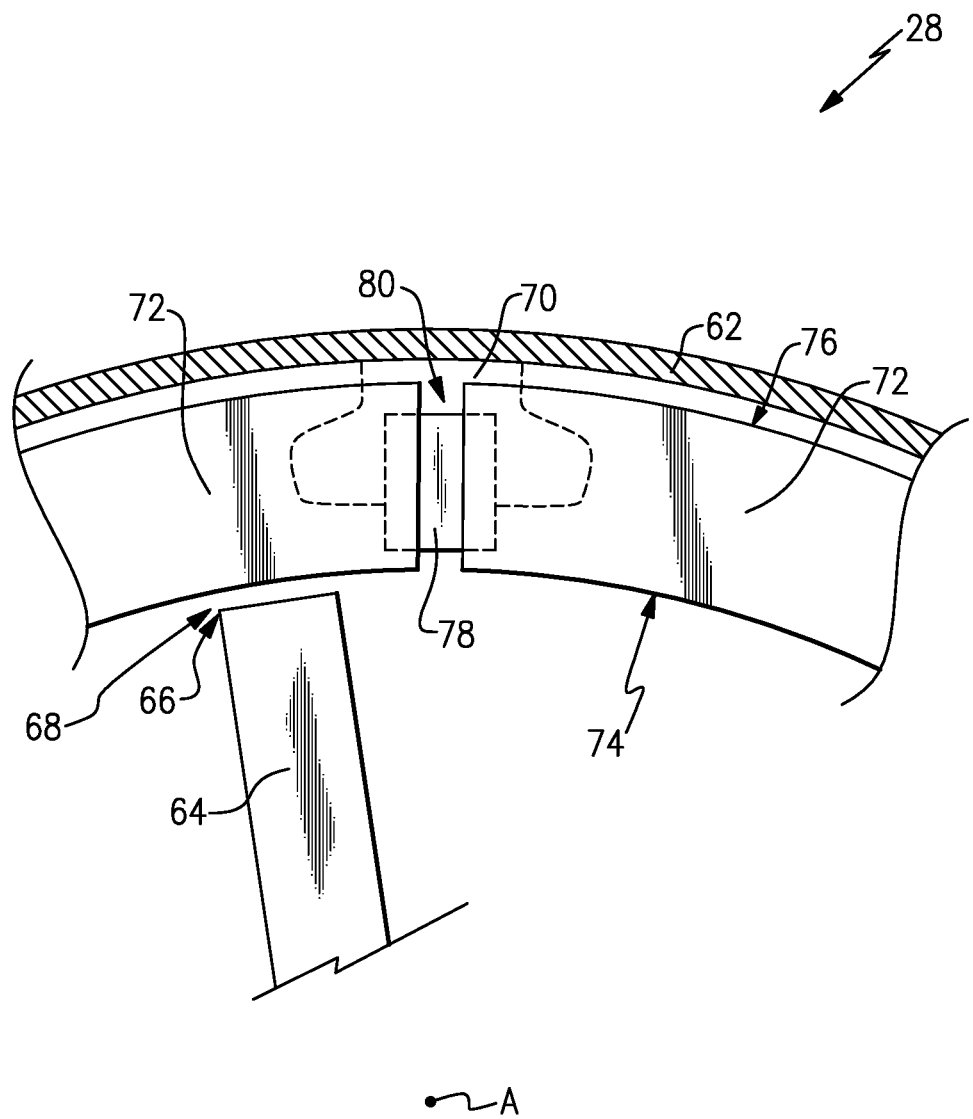
FIG. 2 is a schematic view of an example blade outer air seal.

Referring to FIG. 2 with continued reference to FIG. 1, a portion of the turbine section 28 is schematically illustrated and includes a turbine rotor blade 64 rotating relative to a radial surface 74 defined by a plurality of blade outer air seals (BOAS) 72. The turbine blade 64 includes a tip 66 that rotates proximate to the radial surface 74 defined by the BOAS 72. The example shown in FIG. 2 is of a single, rotating turbine blade stage and may also be utilized within the compressor section 24.

The BOAS 72 are supported within an engine case 62 with a mount 70. The mount 70 may be an integral part of the case 62 or may be a separate part attached to the case 62. A plurality of BOAS 72 form a full hoop circumferentially about the engine axis A to surround the blades 64. The BOAS 72 control leakage of core flow C in the gap 68 between the tips 66 and the inner surface 74. The illustrated mount 70 is disposed between each BOAS 72 and is one of a plurality of such mounts 70 disposed within the engine case 62. The gap 80 between each of the BOASs 72 is bridged by a feather seal 78 that is assembled between adjacent BOASs 72.

The BOASs 72 encounter extreme pressures and temperatures and therefore it is desirable to utilize materials that are capable of operating in the harsh environments encountered within a gas turbine engine 20. In this disclosed example, each of the BOASs 72 are formed from a ceramic matrix composite material. CMC materials include a plurality of fibers suspended within a ceramic matrix. The fibers can, for example, be ceramic fibers, silicon fibers, carbon fibers, and or metallic fibers. The ceramic matrix material can be any known ceramic material such as silicon carbide. The ceramic matrix composite material provides the desired thermal capabilities to operate within the harsh environment of the turbine section 28.

Figure 3:
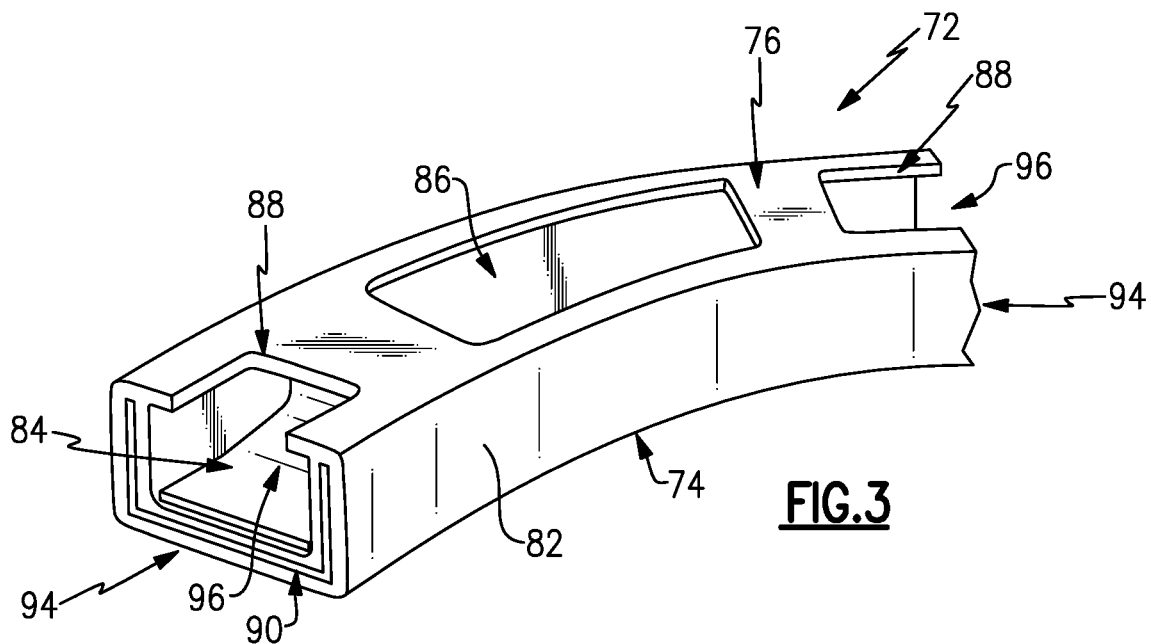
FIG. 3 is a perspective view of an example blade outer air seal embodiment.
Figure 4:
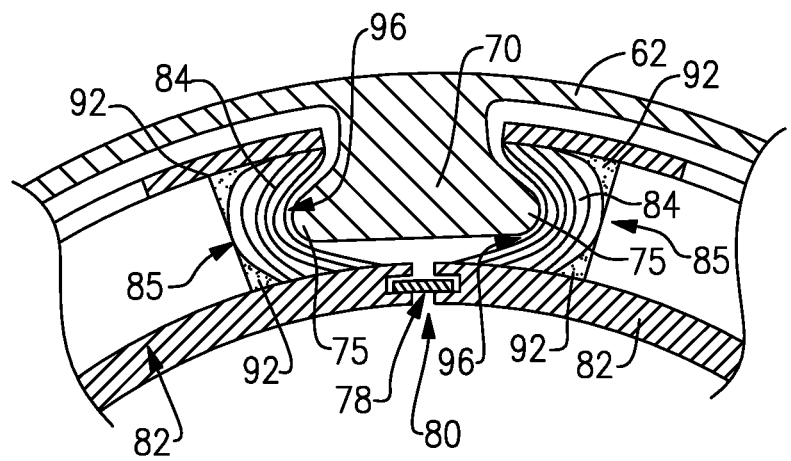
FIG. 4 is a cross-sectional view of an example blade outer air seal.

Referring to FIGS. 3 and 4, the example BOAS 72 comprises a tube 82 with open ends 94 into which are assembled and mounted preforms 84. In this example, the tube 82 comprises an open structure having a substantially rectangular shape in cross-section. However, the tube 82 may be shaped differently and remain within the contemplation of this disclosure. The preforms 84 define first and second slots 96 that correspond with a shape and contour of the mount 70. The example disclosed mount 70 includes outward extending arms 75 that fit within the slots 96 defined by the preforms 84. Each of the open ends 94 also includes a groove 90 for the feather seal 78.

The open ends 94 each have a corresponding cutout 88 within the top surface 76 that is open the corresponding end 94. The cutouts 88 corresponds with a profile of the mount 70 such that the mount 70 may extend into the open ends 94 of the tube 82. The tube 82 may also include an opening 86 along the top surface 76 utilized to provide cooling air or to reduce the total weight of the BOAS 72. One or several openings 86 may be utilized and are within the contemplation of this disclosure. The preform 84 is formed separate from the tube 82 and assembled into each of the open ends 94.

Referring to FIG. 4 with continued reference to FIG. 3, an interface between adjacent BOASs 72 is shown with arms 75 of the mount 70 extending into corresponding slots 96 defined by preforms 84 within separate BOASs 72. It should be appreciated that each BOAS 72 includes first and second open ends 94 that correspond with the mount 70 provided in the engine case 62. The preforms 84 are formed separately from the tube 82 and installed to define the slots 96 that correspond with the mount 70.

Inserts 92 are provided along with each of the preforms 84 to support curved portions on a back side 85 of each preform 84. Each of the preforms 84 is formed from a plurality of fibers that substantially follow a contour of the desired slot 96. In this disclosed example, the slot 96 comprises a substantially c-shaped contour in cross-section that corresponds with arms 75 of the example mount 70. It should be appreciated that other shapes and contours could be utilized and are within the contemplation of this disclosure. Moreover, the specific fit between the preform 84 and the arms 75 of the mount 70 are such that excessive movement is prevented while accommodating relative thermal expansion between the case 62, mount 70 and the BOASs 72. Additionally, each of the BOASs 72 is designed and dimensioned to accommodate thermal expansion and movement relative to the rotating turbine blade 64.

Figures 5, 6A, 6B, 6C:
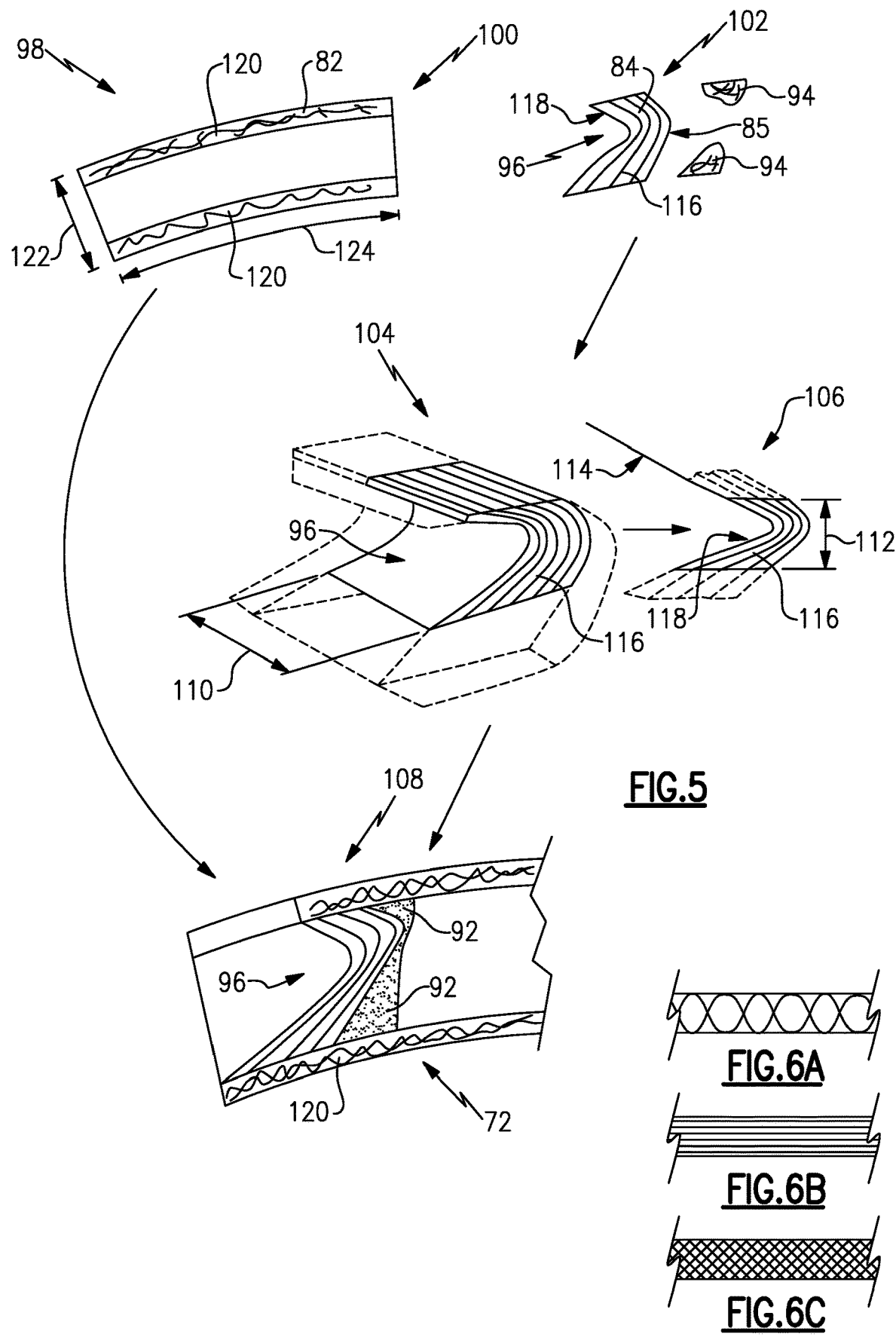
FIG. 5 is a schematic view of an example method of forming a blade BOAS.
FIG. 6A is a schematic view of an example primary fiber orientation.
FIG. 6B is a schematic view of another example primary fiber orientation for the tube.
FIG. 6C is yet another example of the primary fiber orientation for the tube.

Referring to FIG. 5 with continued reference to FIG. 4, a schematic illustration of a method of fabricating the example disclosed BOAS 72 is shown and generally indicated at 98. The method 98 includes an initial step 100 of forming the tube 82. The tube 82 will include a width 122 and a longitudinal length 124. A plurality of fibers will be included along the length 124 to provide the substantial structure of the tube 82.

Referring to FIGS. 6A, 6B and 6C, the example tube 82 is formed from a plurality of fibers 120 disposed within a ceramic matrix that are provided at a defined orientation. The desired orientation of the fibers 120 can be one or a combination determined to provide the desired mechanical properties of the tube 82.

In the example illustrated in FIG. 6A, the primary fibers 120 are orientated in a three dimensional braid.

Referring to FIG. 6B, the primary fibers 120 are layered in a two-dimensional layers that extend substantially along the longitudinal length 124 of the tube 82.

Referring to FIG. 6C, a schematic view of another fiber orientation is illustrated and shows the primary fibers 120 orientated in a substantially three-dimensional woven mat that extends in the direction of the longitudinal length of the tube 82.

Referring back to FIG. 5, formation of the preforms 84 is schematically illustrated at 102 and also includes formation of the inserts 94. Each of the preforms are formed with primary fibers 116 suspended in a ceramic matrix. The primary fibers 116 are orientated to follow a contour 118 that is utilized to define the slot 96. In this example, the fibers 116 substantially follow the contour 118 of the slot 96. The inserts 94 are formed from randomly orientated fibers or other compatible CMC material and fibers. The inserts 94 in this disclosed example are formed separate from the preforms 84 and are shaped to correspond with the back side 85 contour of the preform 84. The inserts 94 engage the back side 85 of the preform 84 to reduce and eliminate any unsupported region or area once installed into the tube 82. Although, the example inserts 94 are disclosed as separate parts, formation of the preform 84 to include integral structures on the back side 85 for support could be utilized and are within the contemplation of this disclosure.

The preforms 84 and inserts 92 can be formed using known CMC techniques including layering of a number of CMC sheets, polymer infiltration (PIP), chemical vapor infiltration (CVI) and chemical vapor deposition (CVD). In these processes the primary fibers are provided as a preform that is subsequently infiltrated with a ceramic matrix material. By forming the tube 82, preform 84 and inserts 92 separately, the individual structures have increased quality and can be formed with densities and material properties that would be difficult to attain when forming the entire BOAS as a single structure.

Each of the preforms 84 are initially formed in a larger size than is required to fit within the tube 82. As is shown at 104, each of the preforms 84 is initially machined to provide a desired width 110. The primary fibers 116 are orientated to define the slot 96 and once the preform 84 is initially machined to provide a desired width as indicated at 110. The machining operation can include grinding, cutting or any other machining operations understood to be compatible with CMC materials.

As indicated at 106, the height of the preform 84 is then adjusted to fit within the tube 82. All machining operations on the preform 84 are made with respect to a datum schematically indicated at 114 that corresponds with the mount structure 70. It is the slot 96 of the preform 84 that provides the origin to which all dimensions include the width 110, height 112 along with the shape of the slot 96 are orientated such that the installed preform 84 corresponds with the features of the mount 70.

Once the preform 84 is machined to the proper, desired size, it is installed within the tube 82 as schematically indicated at 108. Installation of the preform 84 into the end of the tube 82 defines the slots 96 within the completed BOAS 72. The preforms 84 are installed such that the slot 96 defined by the preform 84 corresponds with the open ends 94 and cut out 88 of the tube 82.

Assembly of the preforms 84 and inserts 94 to the tube 82, 84 can be accomplished by any means understood known by those skilled in the art for adhesion of CMC materials to one another. In one example embodiment, the tube 82 and preform 84 are assembled in a partially cured condition and then fully cured together to provide a desired adhesion and structure. In another example embodiment a ceramic matrix material is further infused into a partially cured tube 82, preform 84 and inserts 92 once assembled and finally cured to form one continuous structure. Moreover, other known processes and methods of joining CMC parts could be utilized within the contemplation of this disclosure.

Accordingly, the example BOAS 72 includes separately formed CMC components to form different structures for mounting and definition of the boundary surface to increase build quality, strength and durability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A blade outer air seal (BOAS) comprising:
   a tube formed of a ceramic matrix composite (CMC) material, the tube defining an enclosed rectangular shape with top, bottom and side surfaces and including a first open end and a second open end;
   a first preform disposed within the tube at the first open end and a second preform disposed within tube at the second open end, the first preform and the second preform defining a mount for the BOAS, wherein the first preform and the second preform are formed from a CMC material.

2. The BOAS as recited in claim 1, wherein the first preform in the first open end faces circumferentially outward and the second preform in the second open end faces circumferentially outward in a direction opposite the first preform.

3. The BOAS as recited in claim 2, wherein the first preform and the second preform define a curved surface defining a first slot on the first end and a second slot on the second end.

4. The BOAS as recited in claim 3, wherein the first preform and the second preform have primary fibers following a contour of a corresponding one of the first slot and the second slot.

5. The BOAS as recited in claim 4, including at least one insert for each of the first preform and the second preform supporting a portion of the corresponding one of the first preform and the second preform.

6. The BOAS as recited in claim 2, wherein the tube includes a radially inner surface and a radially outer surface, the radially outer surface including a first cutout and a second cutout at respective first and second ends.

7. The BOAS as recited in claim 6, wherein each of the first end and the second end includes an end groove for a seal.

8. The BOAS as recited in claim 1, wherein the tube has primary CMC fibers formed as one of a three-dimensional braid, a plurality of two-dimensional layers or a three-dimensional weave.

9. The BOAS as recited in claim 1, wherein the tube has primary CMC fibers following a longitudinal length of the BOAS.

10. A gas turbine engine comprising:
    a case;
    a mount attached to the case;
    a blade outer air seal (BOAS) having a preform disposed within a tube, the tube defining an enclosed rectangular shape with top, bottom and side surfaces, the preform defining a slot for receiving the mount in a first open end and a second open end of the tube, wherein the tube and the preform are formed of a ceramic matrix composite (CMC) material.

11. The gas turbine engine as recited in claim 10, wherein the first open end and the second open end are disposed at opposite sides of the BOAS, and the preform comprises a first preform defining a first slot in the first open end facing circumferentially outward and a second preform defines a second slot in the second open end facing circumferentially outward opposite the first preform.

12. The gas turbine engine as recited in claim 11, wherein the first preform and the second preform have primary fibers following a contour of a corresponding one of the first slot and the second slot.

13. The gas turbine engine as recited in claim 12, including at least one insert for each of the first preform and the second preform supporting a portion of the corresponding one of the first preform and the second preform.

14. The gas turbine engine as recited in claim 12, wherein the tube includes a radially inner surface and a radially outer surface, the radially outer surface including a first cutout and a second cutout at respective first and second ends.

15. The BOAS as recited in claim 12, wherein each of the first end and the second end includes an end groove for a seal.

16. A method of forming a blade outer air seal (BOAS) comprising:

forming a rectangular tube from a ceramic matrix composite (CMC) material, the rectangular tube defining an enclosed shape having top, bottom and side surfaces;

forming a first preform and a second preform from a CMC material; and assembling the first preform into a first end of the tube and the second preform into a second end of the tube.

17. The method as recited in claim 16, wherein the first preform and the second preform are formed separate from the tube to define a respective first slot and second slot and forming of the first preform and the second preform includes orientating primary fibers to follow a contour of the respective first slot and the second slot.

18. The method as recited in claim 16, including forming the tube to include a radially outer surface and a radially inner surface and forming the radially outer surface to include a first cutout at the first end and a second cutout at the second end.

19. The method as recited in claim 16, wherein assembling the first preform into the first end and the second preform into the second end includes installing at least one insert for supporting a portion of each of the first preform and the second preform.

\* \* \* \* \*